United States Patent [19]
Neddenriep et al.

[11] Patent Number: 5,711,830
[45] Date of Patent: Jan. 27, 1998

[54] PNEUMATIC VEHICLE TIRE WITH SPECIFIED BEAD CORE CROSS-SECTION

[75] Inventors: Thomas Neddenriep, Schwarmstedt; Klaus Thielemann, Hildesheim, both of Germany

[73] Assignee: Continental Aktiengesellschaft, Hannover, Germany

[21] Appl. No.: 409,979

[22] Filed: Mar. 24, 1995

[30] Foreign Application Priority Data

Mar. 25, 1994 [DE] Germany .......................... 44 10 368.9

[51] Int. Cl.⁶ .................................................. B60C 15/04
[52] U.S. Cl. .................................... 152/540; 245/1.5
[58] Field of Search ............................ 152/539–540; 245/1.5

[56] References Cited

U.S. PATENT DOCUMENTS

| | | | |
|---|---|---|---|
| 4,192,368 | 3/1980 | Maiocchi ........................... | 152/540 |
| 4,216,814 | 8/1980 | Grosch et al. ..................... | 152/540 |
| 5,263,526 | 11/1993 | Oare et al. . | |
| 5,423,366 | 6/1995 | Yamada et al. ................... | 152/540 X |
| 5,511,600 | 4/1996 | Glotzbach ........................ | 152/540 |

FOREIGN PATENT DOCUMENTS

| | | | |
|---|---|---|---|
| 0615867 | 9/1994 | European Pat. Off. ............. | 245/1.5 |
| 2755533 | 6/1978 | Germany . | |

OTHER PUBLICATIONS

Patent Abstracts of Japan, M–1084 Feb. 20, 1991, vol. 15, No. 73 & JP–A–2–296509, Dec. 7, 1990, Takahira.
Patent Abstracts of Japan, M–1094 Mar. 18, 1991, vol. 15, No. 113 & JP–A3–5218, Minami et al.

*Primary Examiner*—Adrienne C. Johnstone
*Attorney, Agent, or Firm*—Robert W. Becker & Associates

[57] ABSTRACT

A pneumatic vehicle tire with an annular bead core consisting of multiple layers of wound wire has a bead core with a cross-section that, based on a hexagonal cross-sectional area defined by a radially outer and a radially inner side, a radially outer and axially outer side, a radially outer and axially inner side, a radially inner and axially outer side, and a radially inner and axially inner side, has a cross-sectional portion that is free of wire windings. The cross-sectional portion has a triangular or quadrangular shape. The triangular shape is delimited by the radially outer side and the radially outer and axially outer side and a connecting line between free ends of the radially outer side and the radially outer and axially outer side. The quadrangular portion is delimited by the radially outer side and the radially outer and axially outer side, a section of the radially inner and axially outer side, and a connecting line between a free end of the radially outer side and an end point of the section of the radially inner and axially outer side. When based on a rectangular cross-sectional area, defined by n rows and m layers of windings and having a radially outermost corner, a cross-sectional portion free of windings has a triangular shape.

5 Claims, 3 Drawing Sheets

PNEUMATIC VEHICLE TIRE WITH SPECIFIED BEAD CORE CROSS-SECTION

BACKGROUND OF THE INVENTION

The present invention relates to a pneumatic vehicle tire with an annular bead core that is comprised of one or a plurality of wires wound in a plurality of layers.

The bead of tubeless pneumatic vehicle tires must be seated under great prestress on the wheel rim in order to provide a sufficient sealing action. In order to provide the bead with a sufficient stability, an annular wire bead core is embedded therein.

Bead cores can be classified as hexagonal cores, having a hexagonal cross-section, and rectangular or parallelogram cores the cross-section of which is rectangular or in the shape of a parallelogram. Hexagonal cores are comprised of a single round wire that is wound in a plurality of layers and optionally rubber-coated. Rectangular or parallelogram-shaped cores can be formed of a plurality of rectangular, non-coated wires that can also be wound in a plurality of layers.

U.S. Pat. No. 5,263,526 discloses a tubeless pneumatic vehicle tire with a substantially triangular bead core that is wound in a plurality of layers of round wire. The area of the core cross-section is supposed to be smaller than the area of an isosceles triangle.

Especially in hexagonal and rectangular cores the individual wires, wire layers or wire windings are loaded differently which results in different fatigue behavior due to the plurality of changing loads to which a pneumatic vehicle tire is subjected. This means that a wire to be used in bead cores must be designed such that a sufficient stability, and thus tire safety, of the areas that are subjected to greatest load is ensured. The tire geometry causes the axially inner areas of the bead core to be loaded approximately 3 to 6 times higher than the axially outer areas.

It is therefore an object of the present invention to improve a pneumatic vehicle tire with an annular bead core of the aforementioned kind such that loading of the windings of the bead cores is made more uniform across the cross-sectional width.

SUMMARY OF THE INVENTION

The pneumatic vehicle tire according to the present invention is primarily characterized by:

an annular bead core comprised of multiple layers of wound wire;

wherein the bead core has a cross-section in which, based on a hexagonal cross-sectional area defined by a radially outer and a radially inner side, a radially outer and axially outer side, a radially outer and axially inner side, a radially inner and axially outer side, and a radially inner and axially inner side, a cross-sectional portion of the hexagonal cross-sectional area is free of wire windings, the cross-sectional portion having a triangular shape; and wherein the cross-sectional portion is delimited by the radially outer side and the radial outer and axially outer side and a connecting line between free ends of the radially outer side and the radially outer and axially outer side.

Advantageously, the cross-sectional portion is 10 to 25% of the hexagonal cross-sectional area.

Preferably, the wire has a round or an angular cross-section and, in a preferred embodiment, can be rubber-coated.

In another embodiment of the present invention the pneumatic vehicle tire is primarily characterized by:

an annular bead core comprised of multiple layers of wound wire;

wherein the bead core has a cross-section in which, based on a hexagonal cross-sectional area defined by a radially outer and an radially inner side, a radially and axially outer side, a radially outer and axially inner side, a radially inner and axially outer side, and a radially inner and axially inner side, a cross-sectional portion of the hexagonal cross-section is free of wire windings, the cross-sectional portion having a quadrangular shape; and wherein the cross-sectional portion is delimited by the radially outer side and the radially outer and axially outer side, a section of the radially inner and axially outer side, and a connecting line between a free end of the radially outer side and an end point of the section of the radially inner and axially outer side.

Preferably, the cross-sectional portion is 10 to 25% of the hexagonal cross-sectional area. Advantageously, the wire has a round or angular cross-section and, in a preferred embodiment, is rubber-coated.

In yet another embodiment of the present invention the pneumatic vehicle tire is primarily characterized by:

an annular bead core comprised of multiple layers of windings of at least one wound wire;

wherein the bead core has a cross-section in which, based on a rectangular cross-sectional area defined by n rows and m layers of the windings and having a radially outermost corner, a cross-sectional portion is free of the windings, the cross-sectional portion having a triangular shape; and wherein the cross-sectional portion is defined by the radially outermost corner of the rectangular cross-section, a radially inner corner, and an axially inner corner, wherein the axially inner corner is defined by omitting more than m-3 of the windings and wherein the radially inner corner is defined by omitting more than n-3 of the windings.

In the context of the present invention, "rectangular" is meant to also include a parallelogram shape parallelogram being a "tilted" rectangle).

Preferably, the cross-sectional portion is 10 to 25% of the rectangular cross-sectional area.

Advantageously, the wire has a round or an angular cross-section and is preferably rubber-coated.

According to the present invention, a pneumatic vehicle tire with an annular bead core which is comprised of a plurality of layers of wound wire or wires, when having a cross-sectional area in the shape of a hexagon, has a triangular or quadrangular portion in which windings are omitted. Preferably, the cross-sectional portion is quadrangular and the corner closest to the rim flange is located on the radial inner and axial outer side of the hexagonal cross-section.

In a pneumatic vehicle tire with a rectangular bead core made of one or a plurality of wires in which the bead core is comprised of an individual wire or wires wound in n rows and m layers or of n wires positioned adjacent to one another and wound in m layers has a cross-sectional portion in the shape of a triangle in which windings are omitted whereby the radially outermost corner of the triangular portion is defined by the radially outermost corner of the rectangle, and starting at this radially outermost corner, the axially inner corner is defined by omitting more than m-3 windings and the radially inner corner is defined by omitting more than n-3 windings.

With these measures, i.e., omitting windings that in conventional bead cores are subjected to the minimum amount of load, the remaining windings are loaded to a higher degree. This higher degree of loading, however, is not uniformly distributed over the remaining windings; instead, the axially outer windings are loaded to a greater extent. This results in a more even load distribution over the entire cross-section of the bead core.

Furthermore, each winding is more uniformly loaded which results in a more uniform radial expansion over the width of the bead core.

By omitting windings, material is saved. This lowers the manufacturing costs of the tire without impairing the reliability of the pneumatic vehicle tire.

Preferably, the triangular or quadrangular portion in which with respect to a conventional hexagonal or rectangular bead core no windings are present, is selected such that 10 to 25% of the windings are omitted, i.e., saved. This means that in a conventional bead core this triangular portion would contain 10 to 25% of the total number of windings.

The wire to be used can have a round as well as an angular cross-section and may be rubber-coated or, in the alternative, can be without rubber coating.

BRIEF DESCRIPTION OF THE DRAWINGS

The object and advantages of the present invention will appear more clearly from the following specification in conjunction with the accompanying drawings, in which.

DESCRIPTION OF PREFERRED EMBODIMENTS

The present invention will now be described in detail with the aid of several specific embodiments utilizing FIGS. 1 through 5.

Figure 1:
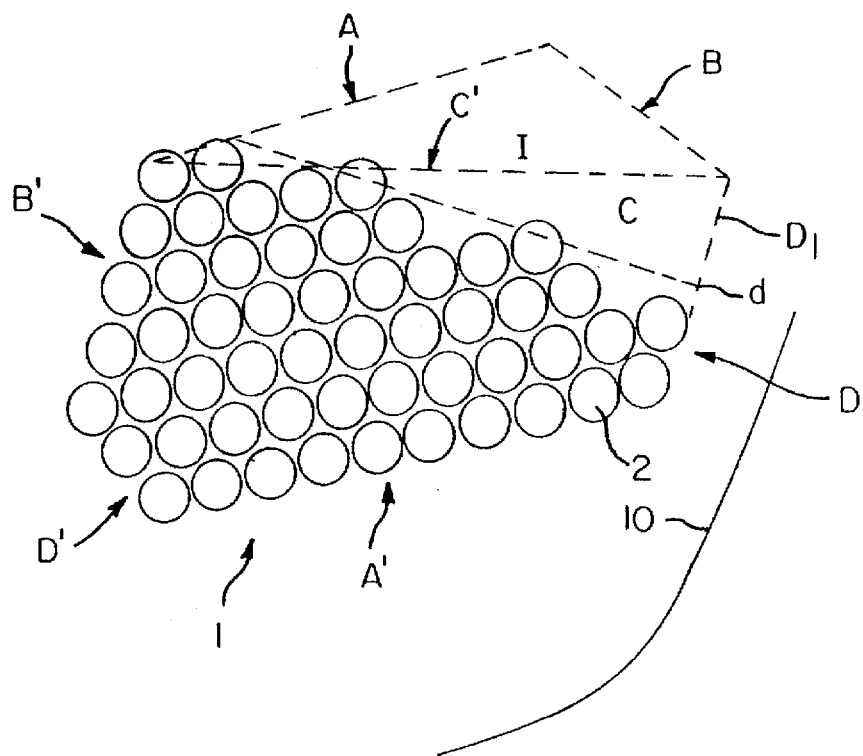
FIG. 1 shows the inventive bead core which is wound from a single wire.
Figure 2:
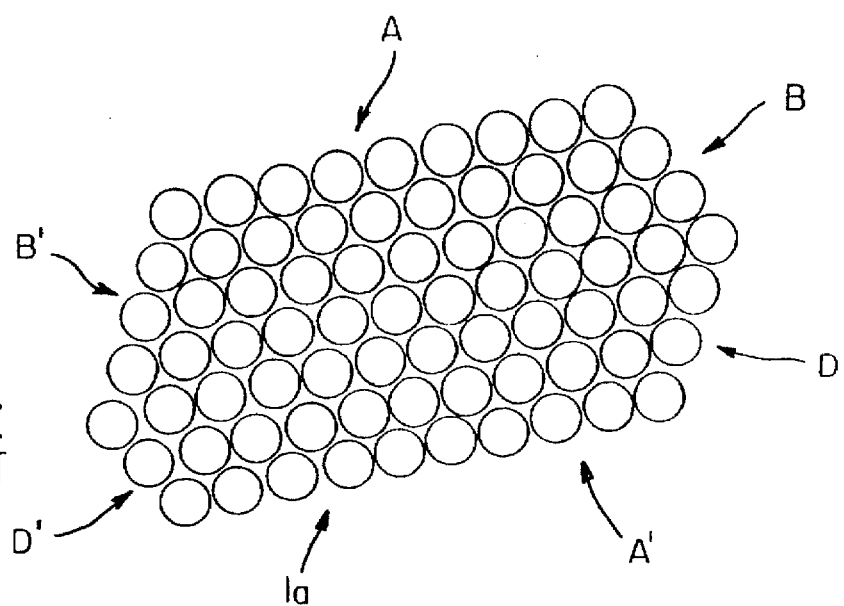
FIG. 2 shows a conventional hexagonal bead core.
Figure 5:
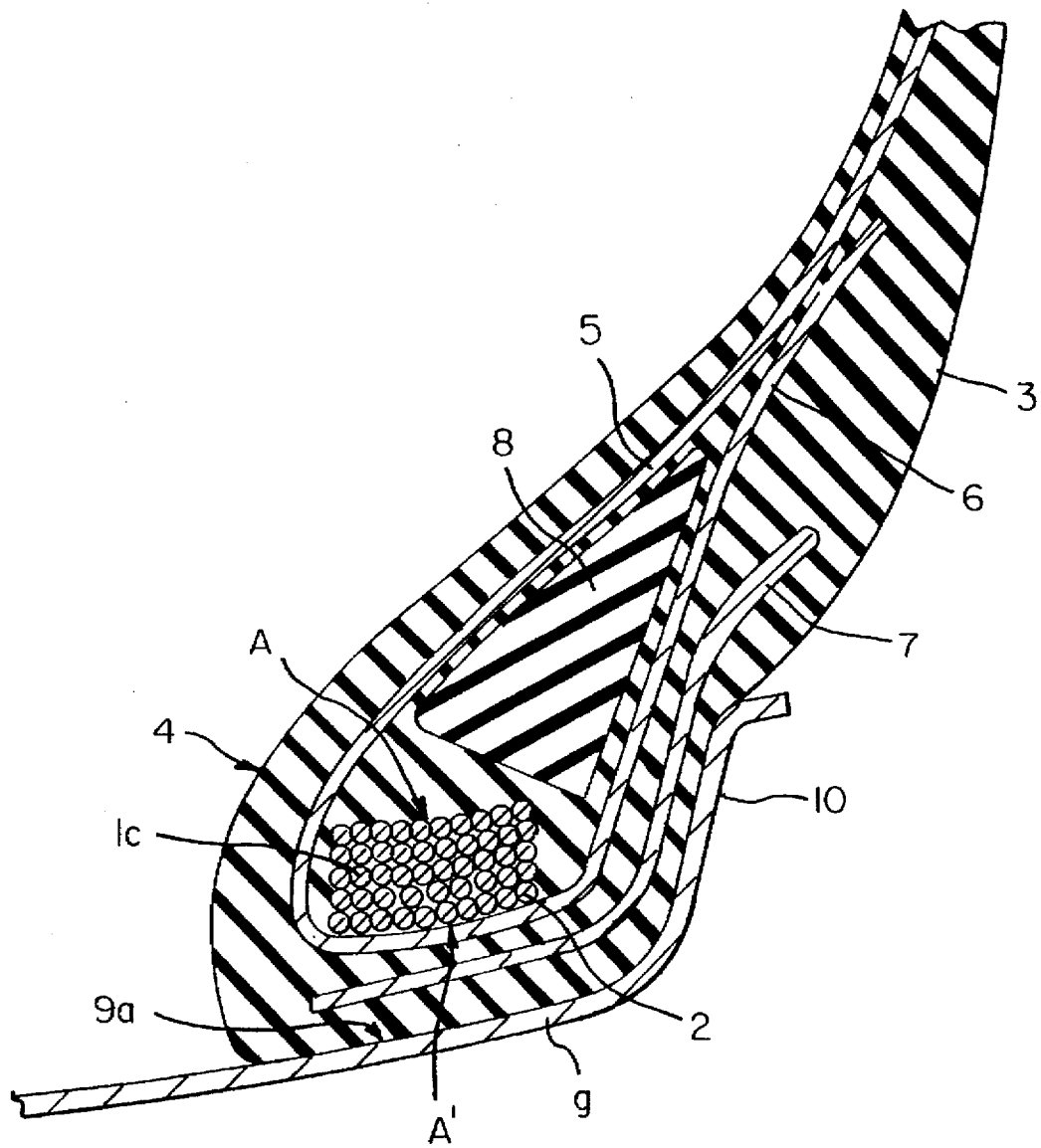
FIG. 5 shows in a schematic partial representation a conventional rectangular bead core arranged within a tire in order to illustrate the axial and radial orientation of the bead core sides.

FIG. 5 shows a portion of a wheel rim 9 with a pneumatic vehicle tire 3 seated thereon. A rectangular bead core 1c is vulcanized into the bead 4. The bead core 1c is comprised of a round wire 2 applied in a plurality of windings and layers. The base of the rectangular bead core 1c extends parallel or approximately parallel to the bed 9a of the wheel rim 9. The tire 3 may have a plurality of reinforcement layers 5, 6, 7, 8 vulcanized into the bead 4. FIG. 1 shows an inventive bead core 1 which, relative to the conventional hexagonal bead core 1a shown in FIG. 2, has a cross-sectional portion I in which no wire windings are present. This portion I is substantially at least triangular, preferably, as shown in the Figure, quadrangular. The hexagonal core cross-section is defined by a radially outer side A, a radially inner side A', a radially outer and axially outer side B, a radially outer and axially inner side B', a radially inner and axially outer side D and a radially inner and axially inner side D'.

In comparison to conventional hexagonal cores 1a (FIG. 2), a triangular portion I in which no windings are present, is defined by the radially outer side A, the radially outer and axially outer side B, as well as the connecting line C' of the two end points of the radially outer side A and the radially outer and axially outer side B (compare FIG. 5 for orientation with respect to the tire). The preferably quadrangular portion I has an end point d which is closest to the rim flange 10. Point d is positioned at the end of a section $D_1$ of the radially inner and axially outer side D. Within this portion I 10 to 25% of the windings of a conventional hexagonal core would be positioned.

Figure 3:
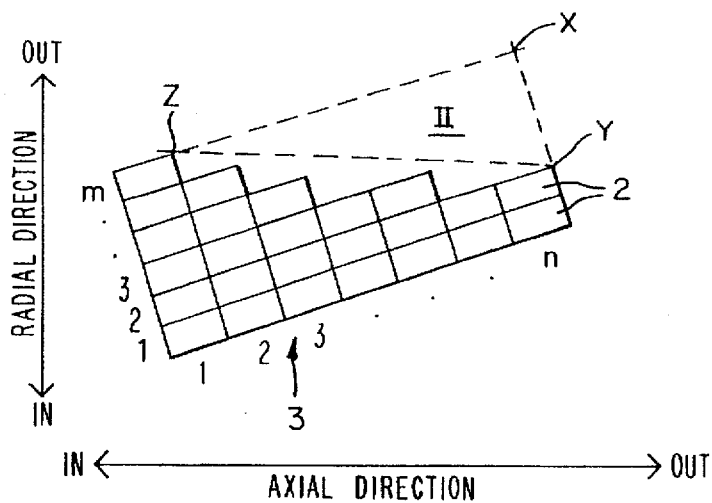
FIG. 3 shows the inventive bead core wound of a plurality of wires.
Figure 3A:
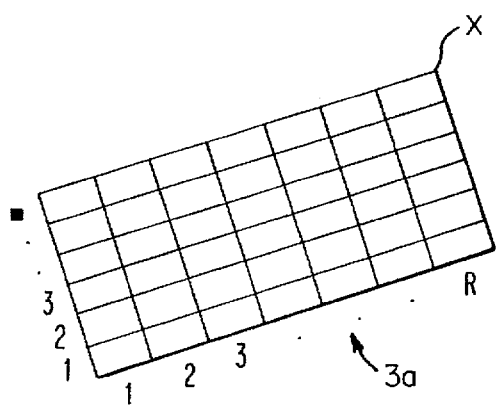
FIG. 3a shows a conventional rectangular bead core.
Figure 4:
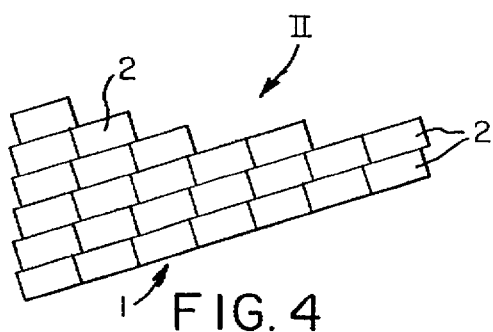
FIG. 4 shows a further embodiment of the present invention with a bead core based on a parallelogram shape.
Figure 4A:
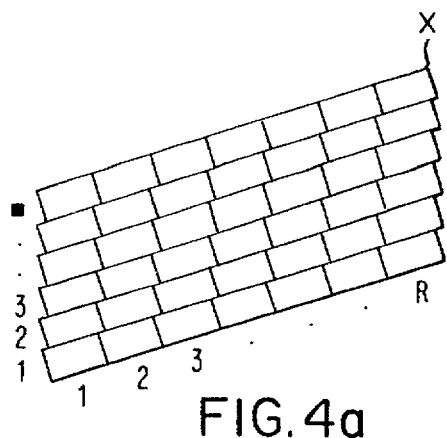
FIG. 4a shows a conventional bead core having the shape of a parallelogram.

FIG. 3 shows a bead core which is wound from n individual wires 2 applied in m layers. The inventive bead core deviates from the conventional rectangular bead core 3a represented in FIG. 3a in that the portion II is free of windings. This portion II is triangular and has corners X, Y, Z.

The radially outer corner X of the triangular portion II is defined by the radially outermost corner X of the rectangular bead core. The axially outer corner Y is defined, when starting at the corner X, by omitting more than m-3 windings, i.e., m-3 layers of wires 2 are omitted. The axially innermost corner Z is defined, starting at the corner X, by omitting more than n-3 windings of wires 2.

In the representation of FIG. 3 n=7 and m=5. This low number of wires 2 and windings does not conform to reality so that shown illustrative example is not in compliance with the given values m-3 and n-3 for defining the corner points.

The present invention is, of course, in no way restricted to the specific disclosure of the specification and drawings, but also encompasses any modifications within the scope of the appended claims.

What we claim is:

1. A pneumatic vehicle tire comprising:
   an annular bead core comprised of multiple layers of wound wire;
   wherein said bead core has a cross-section in which, based on a hexagonal cross-sectional area defined by a radially outer and a radially inner side, a radially outer and axially outer side, a radially outer and axially inner side, a radially inner and axially outer side, and a radially inner and axially inner side, a cross-sectional portion of said hexagonal cross-sectional area is free of wire windings, said cross-sectional portion having a triangular shape;
   said cross-sectional portion delimited by said radially outer side and said radially outer and axially outer side and a connecting line between free ends of said radially outer side and said radially outer and axially outer side; and
   wherein said cross-sectional portion is 10–25% of said hexagonal cross-sectional area.

2. A pneumatic vehicle tire according to claim 1, wherein the wire has a round cross-section.

3. A pneumatic vehicle tire according to claim 2, wherein the wire is rubber-coated.

4. A pneumatic vehicle tire according to claim 1, wherein the wire has an angular cross-section.

5. A pneumatic vehicle tire according to claim 4, wherein the wire is rubber-coated.

* * * * *